United States Patent [19]
Zygraich et al.

[11] 3,907,986
[45] Sept. 23, 1975

[54] LIVE ATTENUATED INFECTIOUS BOVINE RHINOTRACHEITIS VIRUS VACCINES AND PREPARATION THEREOF

[75] Inventors: Nathan Zygraich, Brussels; Michele Lobmann, Ceroux-Mousty, both of Belgium

[73] Assignee: Recherche et Industrie Therapeutiques, Belgium

[22] Filed: Dec. 18, 1972

[21] Appl. No.: 316,178

[52] U.S. Cl. .................................... 424/89; 195/1.3
[51] Int. Cl.² ........................................... C12K 7/00
[58] Field of Search ........................................ 424/89

[56] References Cited
UNITED STATES PATENTS

| | | | |
|---|---|---|---|
| 2,934,473 | 4/1960 | York et al. | 424/89 |
| 2,941,925 | 6/1960 | York et al. | 424/89 |
| 3,048,524 | 8/1962 | Bass | 424/89 |
| 3,052,606 | 9/1962 | Gierer et al. | 424/89 |
| 3,057,783 | 10/1962 | Cabasso | 424/89 |
| 3,366,543 | 1/1968 | Kucera | 195/1.3 |

FOREIGN PATENTS OR APPLICATIONS

1,081,606   11/1960   Germany .................. 424/89

OTHER PUBLICATIONS

Rweyemomu, Vet. Bull., 40(2):73–82, Feb. 1970, "Viral Vaccines in Veterinary Medicine."

Saxegaard, Vet. Bull., 40(8):605–611, Aug. 1970, "Infectious Bovine Rhinotracheitis...Virus Infection of Cattle..."

*Primary Examiner*—Shep K. Rose
*Attorney, Agent, or Firm*—Alan D. Lourie; William H. Edgerton

[57] ABSTRACT

Genetically stable non-pathogenic strains of infectious bovine rhinotracheitis virus are obtained by combination of (a) induction and isolation of temperature-sensitive mutant strains and (b) serial passages (of the obtained temperature-sensitive strains) in heterologous cell cultures. The obtained virus strains are useful for vaccine production.

6 Claims, No Drawings

LIVE ATTENUATED INFECTIOUS BOVINE RHINOTRACHEITIS VIRUS VACCINES AND PREPARATION THEREOF

The present invention relates to a process of producing genetically stable non-pathogenic strains of infectious bovine rhinotracheitis (IBR) virus and to live attenuated virus vaccines containing them.

Different IBR live virus vaccines are known but these vaccines show pronounced residual pathogenicity due to unhindered multiplication of their constituting viral material in the internal organs of the animal causing for instance abortion in pregnant cows.

We have now surprisingly found that when combining (a) induction and isolation of temperature-sensitive (ts) mutant strains of infectious bovine rhinotracheitis virus and (b) serial passages of the obtained ts strains in heterologous cell cultures, both steps being performed in definite conditions, genetically stable nonepathogenic strains of infectious bovine rhinotracheitis are obtained which are particularly suitable for vaccine use or production, owing to the fact that they are devoid of the pathogenicity of the previous IBR virus vaccines.

A further advantage of the vaccines of this invention resides in their administration route. The vaccines of this invention indeed are administered intranasally; their constituting IBR virus strains multiply only locally in the upper respiratory tract of the animals, without any detectable virus multiplication at the warmer temperatures of the organism, i.e. in the internal organs of the animals.

For preparing the non-pathogenic IBR virus strains useful for vaccine production according to this invention, either an IBR virus strain directly isolated from a clinical case or an IBR virus strain obtained at the end of serial passages in tissue culture such as for instance primary bovine kidney (PBK) cell culture at a temperature of 30°–32° C ($\pm$ 1°C) may be used as starting material.

The process of this invention thus comprises inducing and isolating a temperature-sensitive mutant strain of infectious bovine rhinotracheitis virus and passaging serially said temperature-sensitive strain in heterologous cell cultures until complete attenuation is obtained.

More particularly, the induction of temperature-sensitive mutant strain is performed by bringing infectious bovine rhinotracheitis virus into contact at a pH comprised between 4 and 5 with a buffered aqueous solution of nitrous acid. The buffered aqueous solution of nitrous acid is preferably nitrous acid in acetic buffer, the concentration of nitrous acid and acetate ion in the reaction medium being N and N/4 respectively, the contact beingn then maintained for 1 to 15 minutes; for instance, the contact is maintained for 10 minutes ($\pm$1) at a pH of 4.6 ($\pm$0.1) at room temperature.

The so-obtained temperature-sensitive (ts) mutant strain is then isolated after passage in any tissue culture known to the art for accepting growth of infectious bovine rhinotracheitis virus. For instance, isolation is possibly performed after one passage in primary foetal bovine kidney (PFBK) cell cultures, said passage being conducted at 30°C ($\pm$1°C) for a period of time comprised between 10 and 20 days, preferably for 14 days ($\pm$ 1).

The isolated strain is then further passaged in heterologous cell cultures until complete attenuation is obtained, e.g. from 5 to 15 times in primary rabbit kidney (PRK) cell cultures at a temperature comprised between 30° and 37° C ($\pm$ 1°C) and preferably about 10 passages at 37° C ($\pm$ 1°C) before being used either as a vaccine or for vaccine production.

A genetically stable non-pathogenic strain of infectious bovine rhinotracheitis virus has been obtained according to the process of the present invention.

Our process does not require that the duration of each of the serial passages in heterologous cell cultures be specifically limited; it is only sufficient that virus growth has been established before harvesting the virus and inoculating it in another cell culture for performing the next passage. Nevertheless, it is not recommended to prolong unduly the duration of the passages and, for each serial passage, a maximal duration of one week is advisable for the purpose of this invention.

The so-resulting virus strains show no substantial loss of immunogenicity versus the starting pathogenic IBR virus strain; they are temperature-sensitive and non-pathogenic and valuable for infectious bovine rhinotracheitis live virus vaccine use or production, using therefore any technique known to the art for vaccine production and stabilization. Consequently, the present invention relates to infectious bovine rhinotracheitis live virus vaccines containing at least one infectious bovine rhinotracheitis virus strain obtained by inducing and isolating a temperature-sensitive mutant strain of infectious bovine rhinotracheitis virus and passaging said temperature-sensitive strain in heterologous cell cultures until complete attenuation is obtained and to the process of preparing said vaccines therefrom. According to this embodiment, the invention relates to a method of preparing a non-pathogenic infectious bovine rhinotracheitis live virus vaccine comprising incubating a temperature-sensitive and non-pathogenic infectious bovine rhinotracheitis virus –obtained as indicated above– in primary foetal bovine kidney (PFBK) cell culture at a temperature not exceeding 37° C ($\pm$ 1° C) and preferably ranging from 30° to 32° C ($\pm$ 1° C) and for a period of time sufficient to permit growth of a large amount of said virus, and harvesting the resulting virus material.

The so-obtained infectious bovine rhinotracheitis live virus vaccines are administered topically in the nasopharynx at a dosage unit of at least $10^{4.2}$ TCID$_{50}$ (tissue culture infection dose 50 %) and preferably $10^{5.2}$ TCID$_{50}$.

For vaccinal use, the virus is preferably kept in freeze-dried form and the vaccine is extemporaneously reconstituted by addition of either water or any other pharmaceutical diluent or composition known to the art for the preparation of nasal preparations such as drops or spray.

The following examples illustrate the present invention; they should not be construed as limiting its scope.

EXAMPLE 1

Pathogenic infectious bovine rhinotracheittis (IBR) virus strain 5670 (obtained after serially passaging 12 times in primary bovine kidney (PBK) tissue culture, and IBR virus strain isolated from a typical clinical case) is serially passaged 43 times in primary foetal bovine kidney (PFBK) tissue culture, and the supernatant of the last passage is harvested to yield a virus suspension containing $10^{6.5}$ $TCID_{50}$ per ml.

One ml. of this virus suspension is mixed with 0.5 ml. of a 4 M sodium nitrite aqueous solution in 0.5 ml. of molar acetic acid/sodium acetate buffer (prepared by mixing of glacial acetic acid (6 g.) up to 100 ml. with distilled water and 3 volumes of a solution of sodium acetate (13.6 g.) in 100 ml. of distilled water, both solutions being sterilized for 30 minutes at 121° C), the final pH being 4.6.

The mixture is allowed to react for 10 minutes at room temperature and the reaction is then stopped by dropwise addition of normal sodium hydroxide with stirring up to reaching pH 7.5 ($\pm 0.5$). The pH adjustment is followed by changing of color of the phenol red indicator present in the virus suspension.

The medium is immediately dialyzed for 5 hours at + 4° C($\pm 1$) against phosphate buffer saline (consisting of NaCl (8 g.); KCl (0.2 g.); $Na_2HPO_4$ (1.15 g.); $KH_2PO_4$ (0.2 g.) in distilled water (up to 800 ml.) mixed with a solution of $MgCl_2.6H_2O$ in 100 ml. of distilled water and thereafter with a solution of $CaCl_2$ (0.1 g.) in 100 ml. of distilled water, the final solution being sterilized by filtration, the final pH being comprised between 7.2 and 7.4), this latter being renewed several times up to elimination of the nitrite anion. A sample is titrated and stored at −70° C. The titration is performed by the tube end-point dilution method in primary foetal bovine kidney tissue culture at the non-permissive temperature (39° C/$\pm$ 1° C) using 2 tubes per dilution.

After a 2 week incubation period, the titer is recorded and the sample stored at −70° C is diluted to contain 1 $TCID_{50}$10.2 ml. This diluted sample is inoculated in 28 primary foetal bovine kidney tissue culture tubes using 0.1 ml. inoculum per tube. The tubes are incubated at the permissive temperature (30°C/$\pm$1°C). After various incubation periods ranging from 7 to 17 days, 10 inoculated tubes show a typical IBR cythopathogenic effect; these tubes are labelled 1 to 10 and stored at −70° C. Parallel titrations of these 10 positive samples are performed at the permissive temperature (30° C) and at the non-permissive temperature (39° C). Samples exhibiting a signifiant difference in titer between the permissive and the non-permissive temperatures are further cloned by limit dilution passages.

In this way, by pooling the positive tubes at the $10^{-5}$ dilution of sample No. 6, a suspension of a strain labelled RLB 105 is obtained.

Testing of the so-obtained RLB 105 strain in susceptible calves demonstrates that the strain has some residual pathogenicity; after intranasal inoculation of the same, slight nasal discharge is observed.

RLB 105 strain is then passaged ten times in primary rabbit kidney cell cultures, as follows Three to six-week-old rabits originating from a specific pathogen free colony are used as kidney donors. The kidneys are removed under aseptic conditions. Minced kidney tissue is washed in phosphate buffer saline (consisting of NaCl (8 g.); KCl (0.2 g.); $Na_2HPO_4$ (1.15 g.); $KH_2PO_4$ (0.2 g.) in distilled water (up to 800 ml.) mixed with a solution of $MgCl_2.6H_2O$ in 100 ml. of distilled water and thereafter with a solution of $CaCl_2$ (0.1 g.) in 100 ml. of distilled water, the final solution being sterilized by filtration, the final pH being comprised between 7.2 and 7.4) and trypsinized with a buffered saline solution of trypsin (2.5 g/l. and the mixture is continuously stirred for 10 minutes at a temperature of 37° C. The liquid is then poured off and replaced by an equal volume of fresh trypsin solution. Trypsination is then continued with stirring until exhaustion of the tissue, the cells suspended in the liquid being removed from time to time and then centrifuged at 1,000r.p.m. and the cell sediment is suspended in growth medium (Eagle's basal medium supplemented with 10 % virus screened calf serum, 100 units of sodium penicillin G and 100 mcg of streptomycin sulfate per ml.) to provide about 200,000 cells per ml.

One ml. samples of the cell suspension are inoculated into sterile tubes and inoculated for 4 to 5 days at 37° C. At the end of this initial incubation period, the growth medium is removed and replaced in each tube by 1.5 ml. of Eagle's basal medium containing only 2 % agamma virus screened calf serum. Ten tubes are inoculated with 0.2 ml. of the hereabove obtained RLB 105 virus suspension and incubated at 37° C for periods varying between 3 and 5 days. The virus growth is evidenced by typical cythopathogenic effect and serial passage of the virus to a new primary rabbit kidney tissue culture is carried out when about 50 % of the cells exhibit said cytopathogenic effect. The supernatant fluid is then harvested and a 0.2 ml. sample thereof is used as inoculum for the next passage.

The supernatant fluids of the last passage are harvested, pooled and diluted in a volume ratio of 1:2 with a stabilizing solution known as FG solution and consisting of casitone 60 g.; sucrose 100 g.; sodium phosphate dibasic (M/15) 75 ml.; potassium phosphate monobasic (M/15) 25 ml.; mono-potassium glutamate 20 g.; distilled water : sufficient to produce 4.25 liters and the mixture is freeze-dried to yield IBR virus strain No. 5671.

TS CHARACTER OF IBR STRAIN 5671

Virus growth at different temperatures has been determined by titration. The results are summarized in Table I, indicating a cut-off temperature of 39° C(± 0.5° C). The difference in yield between strain 5671 and the parent strain is shown in Table I and demonstrates the low leakiness of strain No. 5671.

TABLE I

| Strain | Virus yield $TCID_{50}$(expressed in $log_{10}$/0.1 ml.) at 30° C | at 39° C |
|---|---|---|
| N° 5671 | 5.75 | 0.75 |
| N° 5670 | 5.75 | 5.75 |

The stability of the ts character of strain No. 5671 has been demonstrated in vitro and in vivo, as follows:

a. in vitro

Strain No. 5671 has been passaged in primary foetal bovine kidney (PFBK) cell cultures at 30°, 38° and 39° C. The results are summarized in Table II showing that the ts character remained stable throughout 9 passages at 30° and 38° C while the strain failed to grow after 2 passages at 39° C.

TABLE II

| Temperature of the Passages | Passage level | Virus titer TCID$_{50}$ (in log$_{10}$/0.1ml) at permissive (30°C) and non-permissive temperatures (39°C) | | Difference in virus titer at 30°C and 39°C |
|---|---|---|---|---|
| | | 30° C | 39° C | |
| 30° C | 1st | 5.75 | ≤ 0.5 | ≥5.25 |
| | 3rd | 4.75 | ≤ 0.5 | ≥4.25 |
| | 9th | 5.25 | ≤ 0.5 | ≥4.75 |
| 38° C | 1st | 2.50 | ≤ 0.5 | ≥2 |
| | 3rd | 2.25 | ≤ 0.5 | ≥1.75 |
| | 9th | 3.75 | ≤ 0.5 | ≥3.25 |
| 39° C | 1st | 0.75 | ≤ 0.5 | ≥0.25 |
| | 3rd | 0 | 0 | 0 | b. in vivo

Strain No. 5671 passaged in three to four months old female calves (breed 'Middle Belgium') and re-isolated from the nose of the vaccinated animals has been titrated at permissive (35° and 37° C) and at non-permissive temperature (39° C).

The results are indicated in Table III.

TABLE III

| Reference number of the animal | Day of re-isolation after vaccination | Origin of re-isolation | Virus titer TCID$_{50}$ (expressed in log$_{10}$/0.1 ml.) at the temperature of: | | |
|---|---|---|---|---|---|
| | | | 35° C | 37° C | 39° C |
| 72 | 10 | nasal swabs | ND | 4.7 | 0 |
| 74 | 9 | nasal swabs | ND | 4.3 | 0.3 |
| 88 | 6 | nasal swabs | ND | 4.3 | 0.2 |
| 2 | 5 | turbinates | 5.5 | ND | 1.5 |
| 1 | 5 | turbinates | 5.5 | ND | 1.2 |
| 2 | 5 | tonsil | 5 | ND | 0 |
| 5 | 6 | turbinates | 4.25 | ND | 0 |

ND = not determined.

Comparison of the titers indicated in Table III demonstrates stability of the ts character of strain No. 5671 after in vivo passage.

EXAMPLE 2

Bovine foetal kidneys are removed under aseptic conditions, minced and washed in phosphate buffer saline (consisting of NaCl (8 g.); KCl (0.2 g.); Na$_2$HPO$_4$ (1.15 g.); KH$_2$PO$_4$ (0.2 g.) in distilled water (up to 800 ml.) mixed with a solution of MgCl$_2$.6H$_2$O in 100 ml. of distilled water and thereafter with a solution of CaCl$_2$ (0.1 g.) in 100 ml. of distilled water, the final solution being sterilized by filtration, the final pH being comprised between 7.2 and 7.4) and trypsinized with a buffered saline solution of trypsin (2.5 g/l) and the mixture is continuously stirred for 10 minutes at a temperature of 37° C. The liquid is then poured off and replaced by an equal volume of fresh trypsin solution. Trypsination is then continued with stirring until exhaustion of the tissue, the cells suspended in the liquid being removed from time to time and then centrifuged at 1,000 r.p.m. for 5 minutes and the cell sediment is suspended in growth medium (Hank's basic salt solution supplemented with 10 % virus screened calf serum, 0.5 % lactalbumin hydrolysate, 0.1 % yeast extract and 50 mcg. of neomycin sulfate per ml.) to provide about 200,000 cells per ml.

Aliquots (1 ml.) of the cell suspension are inoculated into 500 square centimeter Roux flasks and incubated for 4 to 5 days at 37° C. At the end of this initial incubation period, the growth medium is removed and the cell monolayer is washed twice with a maintenance medium consisting of Earle's basic salt solution containing 0.5 % lactalbumin hydrolysate; 0.1 % yeast extract; 0.1 % tryptose phosphate broth and 50 mcg. of neomycin sulfate per ml.

Each bovine foetal kidney cell culture flask is inoculated with 1 ml. of a suspension of infectious bovine rhinotracheitis virus strain No. 5671 in distilled water and containing about 2.10$^6$TCID$_{50}$/ml. (i.e. at the multiplicity index of 0.1). Maintenance medium (same composition as the above washings) is added to each flask and the culture is incubated at a temperature of 35° C for a period of time sufficient to permit growth of a large amount of virus, i.e. for at least 3 to 4 days as evidenced by typical IBR cytopathogenic effect.

The supernatant fluids are then harvested, pooled and diluted in a volume ratio of 1:2 with a stabilizing solution known as FG solution and consisting of casitone 60 g.; sucrose 100 g.; sodium phosphate dibasic (M/15) 75 ml.; potassium phosphate monobasic (M/15) 25 ml.; monopotassium glutamate 20 g.; distilled water sufficient to produce one liter.

Virus titration at both permissive (30° C) and nonpermissive temperature (39° C) demonstrates that the ts character of the starting strain No. 5671 has been preserved. The obtained preparation is found to contain 10$^{6.2}$TCID$_{50}$.

The preparation is distributed into glass vials containing either 10$^{5.2}$TCID$_{50}$ or multiples thereof and the vials are freeze-dried and sealed for constituting either single or multiple doses. After reconstitution by adding 1 ml. of water per dosis, the vaccine is administered as nasal drops or spray to the animal.

TS CHARACTER OF THE VACCINE

As indicated in Table IV, testing of the ts character of the obtained vaccine revealed no difference versus the ts character of the strain No. 5671.

TABLE IV

| | Virus titer expressed in TCID$_{50}$ log$_{10}$/0.1 at | | |
|---|---|---|---|
| | 37° C | 38° C | 39° C |
| vaccine | 5.5 | 5.7 | 0.5 |
| strain N° 5671 | 4.3 | 4 | 0.5 |

EXPERIMENTAL TESTING OF THE OBTAINED VACCINE a. vaccination scheme

The vaccine was administered to three among four seronegative three to four months old female calves (breed 'Middle Belgium'), the fourth animal being kept as control. Table V details the vaccination scheme.

TABLE V

| Reference number of the animal | Vaccination route | Inoculated dose (in $TCID_{50}$) | Challenge route | Dose of challenge inoculated |
|---|---|---|---|---|
| 72 | I/N | 2 × 6.5 | I/N | 2 × 6.7 |
| 74 | I/N | 2 × 6.5 | I/N | 2 × 6.7 |
| 88 | I/N | 2 × 6.5 | I/N | 2 × 6.7 |
| 85 | — | — | I/N | 1 × 6.7 |

I/N = intranasal.

b. virus re-isolation from nose

Titers of virus isolated after vaccination according to the vaccination scheme of Table V are given in Table VI. They are expressed in $\log_{10} TCID_{50} 0.1$ ml.

TABLE VI

| Reference number of the animal | Origin of isolate | Virus excreted on post vaccination days | | | | | | | | | | | |
|---|---|---|---|---|---|---|---|---|---|---|---|---|---|
| | | 1 | 2 | 3 | 6 | 7 | 8 | 9 | 10 | 13 | 14 | 20 | 28 |
| 72 | nose | >4.8 | >4.8 | >4.8 | 4.8 | 4.5 | 3.5 | 4.8 | 4.2 | 1.5 | 0 | 0 | 0 |
| 74 | nose | >4.8 | >4.8 | 4.6 | 4.6 | 3.6 | 3.6 | 2.7 | 2.5 | 0 | 0 | 0 | 0 |
| 88 | nose | 4 | 4 | 4.2 | 4.2 | 1.5 | 0 | 0 | 0 | 0 | 0 | 0 | 0 |
| 85 | nose | 0 | 0 | 0 | 0 | 0 | 0 | 0 | 0 | 0 | 0 | 0 | 0 |

All the negative samples were subpassaged in primary bovine foetal kidney (PBFK) cells and remained negative after an incubation period of seven days at 37° C. Titers of challenge virus isolated after challenge performed one month after vaccination according to the vaccination scheme of Table V are given in Table VII. They are expressed in $TCID_{50} \log_{10}/0.1$ ml.

TABLE VII

| Reference Number of the animal | Origin of isolates | Virus titer in post-challenge period (in days) | | | | | | | | |
|---|---|---|---|---|---|---|---|---|---|---|
| | | 1 | 2 | 3 | 6 | 7 | 8 | 9 | 13 | 14 |
| 72 | nose | 2 | 1.7 | 3.7 | 0 | 0 | 0 | 0 | 0 | 0 |
| 74 | nose | 5.5 | >5.7 | 4.7 | 0 | 0 | 0 | 0 | 0 | 0 |
| 88 | nose | >5.7 | 3.5 | 3 | 1.5 | 0 | 0 | 0 | 0 | 0 |
| 85 | nose | >5.7 | >5.7 | >5.7 | >5.7 | 4 | 2 | 2.2 | 0 | 0 |

All negative samples were subpassaged in primary foetal kidney (PFK) cells and remained negative after 7 days incubation at 37° C. The results of Table VII demonstrate that, in the vaccinated animals, the growth of the challenge virus is considerably reduced in the nose.

c. seroconversion after vaccination

The seroneutralization test was carried out according to the constant virus-serum dilution technique. The results of the seroneutralization are indicated in Table VIII. They are expressed as the reciprocal of the dilution for which at least 50 % of the tubes are completely protected against 10 to 100 $TCID_{50}$.

TABLE VIII

| Reference Number of the animal | Weeks after vaccination | | | | Weeks after challenge | |
|---|---|---|---|---|---|---|
| | 0 | 2 | 3 | 4 | 2 | 4 |
| 72 | 0 | 2 | 2 | 4 | 16 | 8 |
| 74 | 0 | 2 | 4 | 4 | >32 | 32 |
| 88 | 0 | 0 | <2 | 2 | >32 | >32 |
| 85 | 0 | 0 | 0 | 0 | 2 | 2 | d. symptomatology

After vaccination, according to the vaccination scheme of Table V, all the animals were observed daily for:
temperature taken in the morning between 8 and 9 o'clock.
hematologic examination.
nasal swabs.
clinical examination.

After challenge (performed one month after vaccination), the same examinations were performed but nasal and vaginal swabs were taken from all animals.
The results are summarized in Table IX.

TABLE IX

| Reference Number of the animal | Period (in days) of Temp. ≥39.6° | After vaccination | | Route of challenge | After Challenge | | Genital symptoms |
|---|---|---|---|---|---|---|---|
| | | Respiratory symptoms | Genital symptoms | | Period (in days) of Temp. ≥39.6° | Respiratory symptoms | |
| 72 | 0 | 0 | 0 | I/N | 0 | 0 | 0 |
| 74 | 0 | 0 | 0 | I/N | 0 | 0 | 0 |
| 88 | 0 | 0 | 0 | I/N | 0 | 0 | 0 |

TABLE IX—Continued

| Reference Number of the animal | Period (in days) of Temp. 39.6° | After vaccination Respiratory symptoms | Genital symptoms | Route of challenge | Period (in days) of Temp. 39.6° | After Challenge Respiratory symptoms | Genital symptoms |
|---|---|---|---|---|---|---|---|
| 85 | 0 | 0 | 0 | I/N I/Vag. | 6 | marked purulent nasal discharge on days 6 and 7 | slight leukorrhea 3 days after challenge. Important vaginal discharge 7 days after challenge. | e. *Ts* character of the virus re-isolated from the nose of vaccinated animals.

As indicated in Table X, testing of the *ts* character of the virus re-isolated from the nose of vaccinated animals revealed no difference versus the *ts* character of strain No. 5671.

TABLE X

| | Post-vaccination period (in days) of Sampling | Titer expressed in $TCID_{50}$ $log_{10}$/ 0.1 ml. at a temperature of: | | |
|---|---|---|---|---|
| | | 37° C | 38° C | 39° C |
| animal 72 | 10 | 4.7 | 4.5 | 0 |
| animal 74 | 9 | 4.3 | 3.3 | 0.3 |
| animal 88 | 6 | 4.3 | 4.3 | 0.2 |
| N° 5671 | — | 4.3 | 4.3 | 0.5 |

The obtained vaccine was tested as follows regarding
a. innocuity
b. tissue distribution after nasal inoculation
c. antigenicity and minimal vaccinating dose
d. transmission to contact animals.

a. Innocuity

The trial was performed on three to four weeks old seronegative female calves (breed 'Friesian dairy cattle') and for which the undiluted sera were negative in the seroneutralization test against 50 $TCID_{50}$ of IBR virus strain ST 2193.

The temperature of three animals to which a 2 ml. dosage unit of vaccine (titer : $10^{6.2}$ $TCID_{50}$ml.) had been administered in the nostril was recorded daily during five days and found normal while temperature rise was recorded in two other animals used as controls having received 2 ml. of a vial preparation of the pathogenic ST 2193 IBR virus strain (virus titer of the preparation : $10^{5.5}$ $TCID_{50}$/ml.).

b. Tissue distribution

The animals used for the innocuity test were sacrificed (animals 1, 2 and 4 five days after inoculation and animals 5 and 6 six days after inoculation) and the organs mentioned in the following Table XI were removed under aseptic conditions. They were then suspended in Eagle's medium with 2 % agamma calf serum at the rate of 1 gr. of tissue/2 ml. This solution was sonicated during two minutes and thereafter centrifuged during 10 minutes at 2,000 r.p.m. The supernatant was passed at the dilutions mentioned in Table XI into secondary foetal bovine kidney cultures with 0.2 ml./tube and three tubes per dilution.

TABLE XI

| Organs taken | | Dilutions |
|---|---|---|
| Nervous system: | brains | $10^0$ to $10^{-2}$ |
| | cerebellum | $10^0$ to $10^{-2}$ |
| | cerebrospinal fluid | $10^0$ to $10^{-2}$ |
| Respiratory system: | turbinates | $10^{-1}$ to $10^{-5}$ |
| | lungs: 7 lobes | $10^0$ to $10^{-4}$ |
| | mandibular lymph nodes | $10^0$ to $10^{-3}$ |
| | parotid lymph nodes | $10^0$ to $10^{-3}$ |
| | suprapharyngeal lymph nodes | $10^0$ to $10^{-3}$ |
| | atlantal lymph nodes | $10^0$ to $10^{-3}$ |
| | costo-cervical lymph nodes | $10^0$ to $10^{-3}$ |
| | bronchial lymph nodes | $10^0$ to $10^{-4}$ |
| Genital system: | whole genital system | $10^0$ to $10^{-2}$ |
| | retromammary lymph nodes | $10^0$ to $10^{-3}$ |
| Spleen | | $10^0$ to $10^{-4}$ |
| Heparinized blood | | $10^0$ to $10^{-2}$ |
| Tonsils | | $10^0$ to $10^{-4}$ |
| Larynx: mucosa and two first rings of the trachea | | $10^0$ to $10^{-4}$ |

The results are summarized in Table XII showing that, except for one isolate of low titer from the cerebrospinal fluid, no virus was recovered from the internal tissues of animal inoculated with the strain No. 5671 (animals 1, 2 and 5) whereas, in animals inoculated with the virulent virus (control animals 4 and 6), the virulent virus could be isolated from different sites of the body or from the lower respiratory tract.

TABLE XII

| ORGANS | Titers in the organs (expressed in $TCID_{50}$/ gr. of organ) Reference Number of Animal | | | | |
|---|---|---|---|---|---|
| | 1 | 2 | 4 | 5 | 6 |
| retromammary lymph nodes | 0 | 0 | 0 | 0 | 0 |
| mandibular lymph nodes | 0 | 0 | 0 | 0 | 0 |
| parotid lymph nodes | 0 | 0 | 0 | 0 | 0 |

TABLE XII—Continued

| ORGANS | Titers in the organs (expressed in TCID$_{50}$/ gr. of organ) Reference Number of Animal | | | | |
|---|---|---|---|---|---|
| | 1 | 2 | 4 | 5 | 6 |
| suprapharyngeal lymph nodes | 0 | NT | 0 | 0 | 0 |
| atlantal lymph nodes | 0 | NT | 0 | 0 | 0 |
| costo-cervical lymph nodes | 0 | 0 | 0.75 | 0 | 0.75 |
| tonsils | 0 | 2 | 1.5 | 0 | 1.75 |
| mucosa of the larynx and two first rings of the trachea | 0 | 0 | >5.5 | 0 | 5.25 |
| turbinates | 5.25 | 5.25 | 6.25 | 3.5 | 5.5 |
| cerebellum | 0 | 0 | 0 | 0 | 0 |
| brains | 0 | 0 | 0 | 0 | 0 |
| cerebrospinal fluid | 0 | 0.75 | 0 | 0 | 0 |
| lungs : diaphr. left | 0 | 0 | 0 | 0 | 0 |
| apical right | 0 | 0 | 3.25 | 0 | 0 |
| cardiac left | 0 | 0 | 1.5 | 0 | 0 |
| apical left | 0 | 0 | 1.5 | 0 | 0 |
| diaphr. right | 0 | 0 | 0 | 0 | 0 |
| cardiac right | 0 | 0 | 0 | 0 | 0 |
| intermediate | 0 | 0 | 1.5 | 0 | 0 |
| bronchial lymph nodes | 0 | 0 | 0.75 | 0 | 0 |
| spleen | 0 | 0 | 0 | 0 | 0 |
| genital organs | 0 | 0 | 0 | 0 | 0 |
| heparinized blood | 0 | 0 | 0 | 0 | 0 |

NT = non tested.

A blind subpassage of the undiluted pool of the lungs of negative animals (No. 1, 2, 5, 6) was carried out in secondary foetal kidneys : the results were negative.

c. Antigenicity and minimal vaccinating dose

The trail was performed on 52 animals (breed 'Middle Belgium') of about three months old : 29 animals were vaccinated intranasally (10 with a $10^{6.2}$ TCID$_{50}$ dose, 10 with a $10^{5.2}$ TCLD$_{50}$ dose and 9 with a $10^{4.2}$ TCLD$_{50}$ dose) and 23 animals were used as direct-contact controls. The serological testing was performed by seroneutralization using the constant virus (30 to 50 TCID$_{50}$) serum dilution technique : the first solution being undiluted. The volume ratio serum/virus was 2/1. The pool was incubated for 1 hour at 37° C.

The results are detailed in the following Table XIII

TABLE XIII

| Group | Dose | Number of seroconverting animals on total number tested | | |
|---|---|---|---|---|
| | | at 3 weeks | at 4 weeks | at 6 weeks |
| Vaccinated | $10^{6.2}$ | 10/10 | 10/10 | 10/10 |
| Controls | " | 0/5 | 1/4 | 2/5 |
| Vaccinated | $10^{5.2}$ | 10/10 | 10/10 | 10/10 |
| Controls | " | 0/10 | 1/10 | 1/10 |
| Vaccinated | $10^{4.2}$ | 5/9 | 4/5 | 8/9 |
| Controls | " | 0/8 | 0/7 | 1/8 |

Screening of titers, 6 weeks after vaccination is given in the following Table XIV

TABLE XIV

| Group | Dose | Number of animals with seroneutralizing titers of: | | | |
|---|---|---|---|---|---|
| | | 0 | 1 | 2 | 4 and above |
| Vaccinated | $10^{6.2}$ | 0 | 0 | 8 | 2 |
| Controls | " | 3 | 2 | 0 | 0 |
| Vaccinated | $10^{5.2}$ | 0 | 2 | 1 | 6 |
| Controls | " | 9 | 1 | 0 | 0 |
| Vaccinated | $10^{4.2}$ | 1 | 5 | 2 | 1 |
| Controls | " | 7 | 1 | 0 | 0 |

From the results of Table XIII and XIV, a dose of $10^{5.2}$ appears as an acceptable vaccinal dosage range.

d. Transmissibility

As can be seen in Table XIII, the vaccine virus was transmitted to a small percentage of calves in direct contact with the vaccinated animals. No symptoms, however, were induced in the contact animals and the vaccine virus showed the same behavior in them as in the vaccinated animals. No reversion to virulence was noticed.

We claim:

1. A live virus infectious bovine rhinotracheitis vaccine comprising an effective dose of at least $10^{4.2}$ TCID$_{50}$ of a temperature-sensitive nitrous acid mutant of a pathogenic infectious bovine rhinotracheitis virus capable of causing abortion in pregnant cows, said mutant being able to multiply locally in the upper respiratory tract of a bovine animal without significant virus multiplication in warmer internal organs, and a pharmaceutical diluent.

2. A vaccine according to claim 1 in a form suitable for intranasal administration.

3. A vaccine according to claim 2, in which the dose is at least $10^{5.2}$ TCID$_{50}$.

4. A vaccine according to claim 1, in which the vaccine is freeze-dried.

5. A process of immunizing a susceptible cow against infectious bovine rhinotracheitis comprising administering to said cow an effective dose of at least $10^{4.2}$ TCID$_{50}$ of a vaccine according to claim 1.

6. A process as claimed in claim 5, where the route of administration is intranasal.

* * * * *